United States Patent Office 3,290,318
Patented Dec. 6, 1966

3,290,318
PHENYL - 2 - PYRIDYLTHIOACETAMIDE COMPOUNDS POSSESSING ANTI-ULCER ACTIVITY
Henry William Sause, Deerfield, Ill., assignor to G. D. Searle & Co., Chicago, Ill., a corporation of Delaware
No Drawing. Filed Sept. 3, 1964, Ser. No. 394,343
4 Claims. (Cl. 260—294.8)

The present invention relates to a group of novel α-substituted 2-pyridinethioacetamides. In particular, it relates to compounds having the following general formula

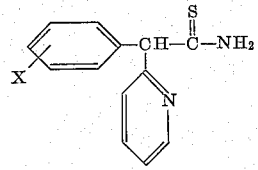

wherein X is selected from the group consisting of hydrogen, halogen, methyl, and methoxy. The halogen atoms referred to above include fluorine, chlorine, bromine, and iodine.

The compounds of this invention are of interest because of their potent anti-ulcer activity. This is demonstrated by their inhibtion of ulceration in the Shay rat. This activity is particularly remarkable since a number of isomers and analogs of the present compounds are essentially inactive under the same conditions. It is further to be noted that, although the present compounds are anti-ulcer agents, they do not possess anticholinergic activity or anti-spasmodic activity, properties generally associated with many of the anti-ulcer agents currently available.

In addition to the anti-ulcer activity noted above, the present compounds possess activity as pepsin inhibitors and appetite inhibitors and they possess anti-bacterial activity which is demonstrated by their inhibition of the growth of the organism *Diplococcus pneumoniae*.

The anti-ulcer activity of these compounds was demonstrated in the following manner. A group of male rats weighing 200–250 grams was fasted for 72 hours and then the pylorus was occulded. 50 milligrams of α-phenyl-2-pyridinethioacetamide was then administered orally to each of the animals. 19 hours later, the stomachs of each of the animals were examined for the number of ulcers and their size. The rating of ulceration for the treated animal was compared with that observed in a group of control animals run simultaneously and it was found that α-phenyl-2-pyridinethioacetamide significantly inhibited the formation of ulcers. α-Phenyl-2-pyridinethioacetamide was also administered at lower doses in this same test and it was found to be an active inhibitor of ulcer formation at doses as low as 0.1 milligram.

The compounds of this invention can be administered in various forms such as tablets, capsules, suspensions, and solutions, as well as other commonly employed forms which are particularly suited for the purpose of oral administration. These forms can consist of a 2-pyridinethioacetamide of the chemical formula described above and vehicles and excipients normally used for pharmaceutical preparations. Suitable excipients and vehicles for use in the preparation of these medicaments include corn starch, sucrose, calcium phosphate, polymethacrylic acid, polyvinylpyrrolidone, microcrystalline cellulose, magnesium stearate, corn oil, cocoa butter, acacia, talc, and lactose, as well as other fillers, binders, disintegrants, lubricants, and bases commonly employed in the preparation of medicaments ready for use. The material of the appropriate composition can be compressed into tablets of the appropriate size or they can be filled by hand or machine into opaque, hard, gelatin capsules of the appropriate size. Solutions can be prepared by dissolving the appropriate amount of one of the active compounds in a pharmaceutically acceptable liquid in which it is soluble.

The compounds of this invention are conveniently prepared by the reaction of an α-substituted 2-pyridine-acetonitrile of the formula

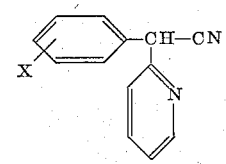

wherein X is defined as above, with hydrogen sulfide in an appropriate solvent. Preferably, the reaction is carried out in a basic solvent such as pyridine. Alternately, the appropriate substituted 2-pyridineacetamide can be reacted with phosphorus pentasulfide to give the corresponding substituted 2-pyridinethioacetamide.

The following examples are presented to further illustrate the present invention; they should not be construed as limiting it in spirit or in scope. In these examples, quantities are indicated in parts by weight and temperatures in degrees centigrade (° C.).

*Example 1*

To a solution of 35.3 parts of phenylacetonitrile and 47.6 parts of 2-bromopyridine in 175 parts of dry toluene is added 53.4 parts of sodamide slowly with stirring over a period of 45 minutes. The resultant mixture is stirred at 100° C. for 2 hours before it is cooled and the excess sodamide is decomposed by the addition of water. The toluene layer is separated and washed with water to remove excess alkali. The toluene solution is extracted with 6 N hydrochloric acid and the acid extract is made alkaline and then extracted with toluene. The toluene solution is dried over sodium sulfate and the solvent is evaporated. Recrystallization of the residue from a mixture of ethanol and hexane gives α-phenyl-2-pyridine-acetonitrile melting at about 87–88° C.

The above procedure is repeated using the appropriate substituted phenylacetonitrile in place of the phenylacetonitrile. Where the final crude product is a liquid, it is purified by distillation. The following compounds are obtained in this way.

α-(4-chlorophenyl)-2-pyridineacetonitrile melting at about 67.5–68° C. after recrystallization from ethanol
α-(2-fluorophenyl)-2-pyridineacetonitrile
α-(4-fluorophenyl)-2-pyridineacetonitrile boiling at about 125–129° C. at 0.5 mm. pressure
α-(4-methoxyphenyl)-2-pyridineacetonitrile
α-(3-methylphenyl)-2-pyridineacetonitrile

*Example 2*

3 parts of α-phenyl-2-pyridineacetonitrile and 1.6 parts of triethylamine are dissolved in 120 parts of pyridine. Hydrogen sulfide gas is bubbled through the solution for 17 hours while the solution is stirred at room temperature. The solution becomes very dark green in color during the first hour of contact with hydrogen sulfide. The solvent is evaporated from the mixture under reduced pressure and the resultant residue is recrystallized from a mixture of hexane and 2-propanol. This gives pale yellow crystals of α-phenyl-2-pyridinethioacetamide melting at about 137.5–138° C. This compound has the following formula

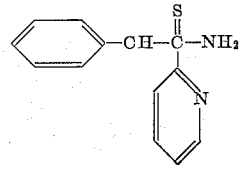

Example 3

A solution is prepared from 11.4 parts of α-(4-chlorophenyl)-2-pyridineacetonitrile, 3.6 parts of triethylamine and 100 parts of pyridine. The solution is stirred at room temperature and hydrogen sulfide gas is bubbled through it for 6 hours. The mixture is then allowed to stand for 17 hours before the solvent is evaporated under reduced pressure. The resultant residue is recrystallized from a mixture of benzene and 2-propanol to give colorless crystals of α-(4-chlorophenyl)-2-pyridinethioacetamide melting at about 160–160.5° C. This compound has the following formula

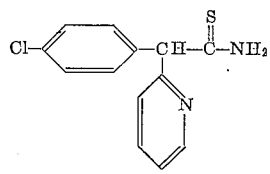

Example 4

If an equivalent quantity of the appropriate α-substituted 2-pyridineacetonitrile is substituted for the α-phenyl-2-pyridineacetonitrile and the reaction with hydrogen sulfide described in Example 2 is repeated, the following compounds are obtained.

α-(2-fluorophenyl)-2-pyridinethioacetamide
α-(4-fluorophenyl)-2-pyridinethioacetamide
α-(4-methoxyphenyl)-2-pyridinethioacetamide
α-(3-methylphenyl)-2-pyridinethioacetamide

What is claimed is:
1. A compound of the formula

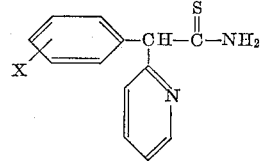

wherein X is selected from the group consisting of hydrogen, halogen, methyl, and methoxy.

2. A compound of the formula

3. α-(4-chlorophenyl)-2-pyridinethioacetamide.
4. α-phenyl-2-pyridinethioacetamide.

References Cited by the Examiner

Libermann et al.: Bull. Soc. Chim., France, 1958, pp. 689–701.

WALTER A. MODANCE, *Primary Examiner.*
ALAN L. ROTMAN, *Assistant Examiner.*